US010840727B1

(12) United States Patent
Subero

(10) Patent No.: US 10,840,727 B1
(45) Date of Patent: Nov. 17, 2020

(54) SMART HOLSTER FOR RECEIVING AND WIRELESSLY CHARGING COMMUNICATION DEVICE

(71) Applicant: Richard Subero, Baldwin, NY (US)

(72) Inventor: Richard Subero, Baldwin, NY (US)

(*) Notice: Subject to any disclaimer, the term of this patent is extended or adjusted under 35 U.S.C. 154(b) by 0 days.

(21) Appl. No.: 16/184,006

(22) Filed: Nov. 8, 2018

Related U.S. Application Data

(60) Provisional application No. 62/583,246, filed on Nov. 8, 2017.

(51) Int. Cl.
| | |
|---|---|
| *H01M 10/44* | (2006.01) |
| *H01M 10/46* | (2006.01) |
| *H02J 7/02* | (2016.01) |
| *H04M 1/04* | (2006.01) |
| *H02J 7/00* | (2006.01) |
| *H02J 50/80* | (2016.01) |
| *H04M 1/725* | (2006.01) |
| *G06F 3/0482* | (2013.01) |
| *H04W 4/80* | (2018.01) |

(52) U.S. Cl.
CPC ............ *H02J 7/025* (2013.01); *H02J 7/0044* (2013.01); *H02J 50/80* (2016.02); *H04M 1/04* (2013.01); *H04M 1/7253* (2013.01); *G06F 3/0482* (2013.01); *H04W 4/80* (2018.02)

(58) Field of Classification Search
CPC ........ H02J 7/355; H02J 7/0042; H02J 7/0021; H02J 7/0026; H02J 7/025; H02J 5/005; H02J 50/10; H02J 7/0091

USPC ........ 320/103, 107, 108, 114, 132, 149, 150
See application file for complete search history.

(56) References Cited

U.S. PATENT DOCUMENTS

| | | |
|---|---|---|
| D529,713 S | 10/2006 | Guyot et al. |
| 7,863,862 B2 * | 1/2011 | Idzik ................ H02J 7/0044 320/114 |
| 7,889,494 B2 * | 2/2011 | Stampfli ................ A45F 5/00 224/663 |
| 7,948,209 B2 | 5/2011 | Jung |
| 8,490,937 B2 | 7/2013 | Crain et al. |
| 8,915,361 B2 | 12/2014 | Rayner |
| 9,027,814 B2 | 5/2015 | Tages et al. |
| 9,345,313 B2 | 5/2016 | Merzon |
| 9,716,401 B2 | 7/2017 | Wojcik |
| 2008/0110946 A1 | 5/2008 | Dixon et al. |

(Continued)

*Primary Examiner* — Edward Tso
(74) *Attorney, Agent, or Firm* — Galgano IP Law PLLC; Thomas M. Galgano

(57) ABSTRACT

A holster for receiving and wirelessly charging a device battery of a multimedia communication device detachably connected to the holster includes a base formed with first and second substantially planar opposed surfaces and sidewalls, a belt clip assembly attached or connected to the first surface, a tension clip attached or connected to the second surface, a rechargeable battery, a Bluetooth device for wirelessly, communicatively coupling the base to the multimedia communication device detachably connected to the base and a wireless charging device for wirelessly charging the device battery using electrical energy stored within the rechargeable battery. Upon attaching the multimedia communication device to the tension clip and wirelessly coupling the base to the multimedia communication device, the device battery can be wirelessly charged using the wireless charging device.

36 Claims, 13 Drawing Sheets

(56) References Cited

U.S. PATENT DOCUMENTS

| | | | |
|---|---|---|---|
| 2009/0096417 A1* | 4/2009 | Idzik | H02J 7/0044 320/115 |
| 2009/0284216 A1* | 11/2009 | Bessa | H02J 7/0044 320/101 |
| 2011/0169451 A1* | 7/2011 | Stampfli | A45F 5/00 320/115 |
| 2011/0227527 A1 | 9/2011 | Zhu et al. | |
| 2013/0285605 A1* | 10/2013 | Partovi | H02J 7/0042 320/108 |
| 2014/0191724 A1* | 7/2014 | Wojcik | H05K 5/0086 320/114 |
| 2014/0232344 A1* | 8/2014 | Drobnik | H02J 7/007 320/118 |
| 2014/0274204 A1* | 9/2014 | Williams | H02J 7/0013 455/556.1 |
| 2015/0194833 A1* | 7/2015 | Fathollahi | H02J 7/0044 320/114 |
| 2015/0270734 A1* | 9/2015 | Davison | H02J 7/0054 320/103 |
| 2016/0134142 A1 | 5/2016 | Murphy | |
| 2016/0345628 A1* | 12/2016 | Sabet | H04M 1/72527 |
| 2017/0000346 A1* | 1/2017 | Duckert | A61B 5/0402 |
| 2018/0059758 A1* | 3/2018 | Boatner | G06K 7/10881 |

\* cited by examiner

SMART HOLSTER FOR RECEIVING AND WIRELESSLY CHARGING COMMUNICATION DEVICE

CROSS-REFERENCE TO RELATED APPLICATION

This application claims priority under 35 USC § 119(e) from U.S. Provisional Patent Application No. 62/583,246, filed Nov. 8, 2017, the contents of which provisional application are incorporated herein by reference.

TECHNICAL FIELD OF THE INVENTION

The technology described herein relates to the fields of smartphone holsters and mobile charging capability. More specifically, the invention is a smart holster and wireless charging system for multimedia communication devices, such as a smartphones, that allow users to wirelessly charge the multimedia communication devices when positioned securely in the smart holster and wirelessly coupled to the smart holster using BLUETOOTH® technology, using commands and/or data input through a user's interface provided by a mobile phone application ("app") downloaded to and operational within the multimedia communication device in order to control the charging.

BACKGROUND OF THE INVENTION

Multimedia communication devices, such as tablets, smartphones, etc., permeate and proliferate our daily existence to the point of ubiquitousness. For example, people are literally dependent on smartphones in their personal and professional lives. The average person spends approximately 4 hours a day on his/her smartphone, according to a recent study. That number is significantly higher for teenagers and young adults who were reared in the age of advanced mobile phone technology. The more a user uses a smartphone for making calls, social media, streaming multimedia content, using apps that run in the background, the power in the rechargeable battery in the smartphone is depleted. Depletion of the smartphone battery typically requires a user to couple the smartphone to a power cord that is coupled to a charging plug which is inserted into a conventional electrical outlet. Keeping up with a conventional smartphone charger and finding an electrical outlet is not always practical or convenient.

Charging a smartphone via a conventional charger and electrical outlet restricts the movement of the user to the length of the power cord if the user operates the smartphone while it is charging. Moreover, finding an electrical outlet can also be a hassle if you need to charge your phone at sporting event or on the beach for instance. There exists a need for users to be able to charge their smartphones anytime and anywhere without the limitations of conventional charging systems. This smart holster charges a smartphone while attached to the person of the user, thus obviating the need for the user to keep up with a conventional phone charger or look for electrical outlets.

SUMMARY OF THE INVENTION

The holster and wireless charging system of the invention overcome the shortcomings of the known arts.

In an embodiment, the invention provides a holster for receiving and wirelessly charging a device battery of a multimedia communication device detachably connected to the holster. The holster comprises a base formed with first and second substantially planar opposed surfaces and sidewalls, means for attaching the multimedia communication device to the base, a rechargeable battery, a charging port for charging the rechargeable battery, a BLUETOOTH® device for wirelessly, communicatively coupling the base to the multimedia communication device detachably connected to the base and a wireless charging device for wirelessly charging the device battery using electrical energy stored within the rechargeable battery. Upon attaching the multimedia communication device to the tension clip and wirelessly coupling the base to the multimedia communication device, the device battery can be wirelessly charged using the wireless charging device.

The means for attaching the multimedia communication device to the base, preferably includes flanges and a tension clip, wherein the flanges extend out of the first surface of the base to surround four corners of the base and tension clip holds the multimedia communication device thereon. A belt clip assembly, which is attached or connected to the base, is provided for connecting the base to any of a user's belt, garment, purse strap and backpack.

The base preferably includes a battery strength indicator that reflects a state of charge of the base's rechargeable battery. In one form, the battery strength indicator comprises a plurality of light-emitting diodes (LEDs) positioned on one of the base sidewalls. Through a user interface, the user selectively determines settings that control charging operation upon wirelessly coupling the detachably connected base to the multimedia communication device. The settings may be predefined by a user profile for the multimedia communication device. Preferably, one of the settings provides for automatically charging the wirelessly coupled and detachably connected multimedia communication device in a case where the strength indicator determines a drop of battery power below 25%, or at a pre-determined time.

The wireless charging device may include a temperature sensor and wherein the wireless charging device de-energizes automatically in a case where a temperature detected by the temperature sensor exceeds a pre-determined temperature.

The holster may further include a digital speaker attached to or integral with the base, for receiving an audio signal comprising sound data from the multimedia communication device coupled and detachably connected thereto and simultaneously outputting the sound data by through the digital speaker as the sound data is output through a speaker in the multimedia communication device, according to the audio signal.

The holster may include a digital projection system attached to or integral with the base, for projecting video data presented on a display of the multimedia communication device coupled and detachably connected thereto and simultaneously projecting the video data onto a surface for viewing as the video data are presented on a display screen of the multimedia communication device.

The holster may include a flash system attached to or integral with the base and controlled to flash concurrently with a flash system of the multimedia communication device coupled and detachably connected thereto.

The base may further comprise an integral, secure digital storage device (SD) that operates as additional memory storage capacity that is accessible to, and operational as supplemental storage for the multimedia communication device. Data is exchanged wirelessly to and from the SD storage device once the multimedia communication device is positioned in and coupled to the holster.

In an embodiment, the invention provides a wireless charging system for wirelessly charging a device battery of a multimedia communication device, the wireless charging system comprising a holster for receiving and wirelessly charging the device battery and an application program that is downloadable to and operational within the multimedia communication device to control wireless communication device functions including wirelessly charging the device battery when the multimedia communications device is detachably connected and wirelessly coupled to the holster.

The holster comprises a base formed with first and second substantially planar opposed surfaces, means for detachably connecting the multimedia communication device to the holster, a rechargeable battery, a charging port for charging the rechargeable battery, a BLUETOOTH® device for wirelessly, communicatively coupling the base to the multimedia communication device and a wireless charging device for wirelessly charging the device battery using electrical energy stored within the rechargeable battery Upon detachably connecting and wirelessly coupling the multimedia communication device to the base of the holster, the application program operates a graphical user interface (GUI) enabling user input for controlling multimedia communication device functions, including a function for effecting the wireless coupling and a function for effecting the wireless charging the device battery.

The means for attaching the multimedia communication device to the base, preferably includes flanges and a tension clip, wherein the flanges extend out of the first surface of the base to surround four corners of the base and tension clip holds the multimedia communication device thereon. A belt clip assembly, which is attached or connected to the base, is provided for connecting the base to any of a user's belt, garment, purse strap and backpack.

The application program is downloaded to the multimedia communication device and stored in memory therein. The application program comprises a set of computer readable instructions stored on a non-transitory, computer readable medium and wherein the computer readable instructions are downloaded to the multimedia communication device. The application program may receive input for controlling the multimedia device functions from a remote computing device, including commands associated with operation of the holster and charging arrangements thereof.

In an alternative embodiment, the wireless charging system further comprises the wireless communication device. The wireless communication device includes means for providing a proximity alert when the multimedia device or smartphone is too far from the charging system, or the charging system is too far from the multimedia device. The proximity alert is intended to let the user know that it is leaving one or the other of the wireless communication device or multimedia device behind.

Preferably, the wireless charging system includes receiving user input through the GUI and maintaining the user input in a profile associated with said multimedia communication device. Upon completing the profile (with the user input re charging characteristics), the GUI prompts the user to wirelessly couple the multimedia communication device to the base. For that matter, the wireless charging system includes a manual on/off switch on the side of the unit next to the battery LED indicator. There is never a need to charge (ever) the multimedia device or smartphone directly even at the end of the day. All the user is required to do is take off the tension clip with the multimedia device or smartphone still attached (coupled) and plug the holster into its wall charger, which will in turn charge the multimedia device or smartphone first, then the holster.

Upon attaching the multimedia communication device to the means for detachably connecting (e.g., the tension clip) and wirelessly coupling the base to the multimedia communication device, the device battery can be wirelessly charged using the wireless charging device. For that matter, the means for detachably connecting include a first receiving flange extends upwardly from two top corners of the second surface of the base and a second receiving flange extends upwardly from two bottom corners of the second surface of the base, where the tension clip is positioned to protrude from the second surface at a midpoint between the two top corners or the two bottom corners.

Preferably, the tension clip is outfitted with a tactile edge to facilitate the detachable attachment and release of the multimedia communication device to the base. And the belt clip assembly includes a clip portion and a tension spring assembly coupled to the clip portion. Preferably, the belt clip assembly includes a swivel connector that provides that the base assembly, and any multimedia communication device detachably connected thereto, to rotate up to 360 degrees. Upon attachment, the belt clip assembly may be rotated and extended to lock at a predetermined angle.

Preferably, the holster further comprises a battery charge indicator arranged in one of the sidewalls of the base and/or a kickstand incorporated on the second surface of the base. In one form, the kickstand comprises an extending planar arm.

In another embodiment, the invention provides a method for wirelessly charging a device battery of a multimedia communication device using a holster comprising a base, means for detachably connecting the multimedia communication device to the base, a rechargeable battery, a charging port for charging the rechargeable battery, a Bluetooth device for wirelessly, communicatively coupling the base to the multimedia communication device and a wireless charging device for wirelessly charging the device battery using electrical energy stored within the rechargeable battery.

The method comprises the steps of downloading to and operating an application program in the multimedia communication device to manage holster operation, including controlling charging the multimedia communication device, connecting the multimedia communication device to the base of the holster and operating the application program to generate a graphical user interface (GUI) for providing user prompts for input for controlling multimedia communication device functions, including a function for effecting wirelessly coupling the holster and multimedia communication device.

The step of operating includes wirelessly charging the device battery in response to a prompt from the user via the GUI or automatically by the application program upon detection a predetermined condition. The step of operating further includes providing a set of parameters for the multimedia communication device, and wherein the parameters control wireless charging thereto. Preferably, the holster includes additional memory storage and wherein the step operating includes controlling access to and from the additional memory storage device by the multimedia communication device. For that matter, the invention includes a computer program product embodying a non-transitory computer readable medium encoded with instructions executable by a processor to implement operation of the application program.

BRIEF DESCRIPTION OF THE DRAWINGS

Other objects and features of the present invention will become apparent from the detailed description considered in connection with the accompanying drawings, which disclose several embodiments of the invention. It is to be understood that the drawings are to be used for the purpose of illustration only and not as a definition of the limits of the invention.

DETAILED DESCRIPTION OF PREFERRED AND ILLUSTRATED EMBODIMENTS

Figure 1:
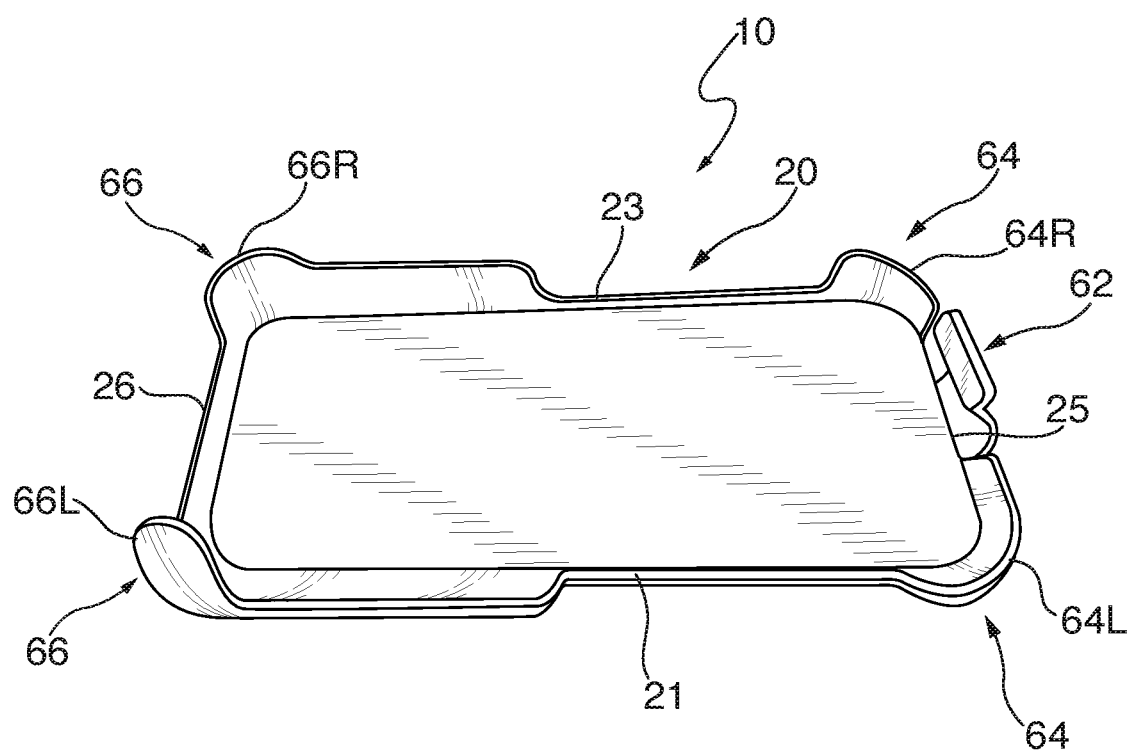
FIG. 1 is a top, front, and right side perspective view of a holster embodying the invention.

The invention is a holster (i.e., a smart holster) for a multimedia communication device, such as a smartphone, that allows a user to wirelessly charge the multimedia communication device placed in the smart holster and wirelessly coupled thereto, to control the operation of the smart holster using Bluetooth (e.g., BLUETOOTH®) technology via a mobile phone application ("app") downloaded to and operational within the multimedia communication device to receive user input for controlling wireless coupling and wireless charging operation. In a preferred embodiment, the invention comprises a wireless charging system for a smartphone, which comprises not only the holster as described, but also the application program for download to and operation within the smartphone to receive user input for controlling wireless coupling and wireless charging operation.

As mentioned earlier, the following teachings of the preferred embodiments of the invention are applicable to a plurality of multimedia devices with a vast array of dimensions and technologies. No limitations are taught herein. The general principles incorporated in the invention may be, applied to embodiments and applications in addition to those taught herein without departing from the context and scope of the present teachings, thus encompassing the broadest scope possible in accordance with said teachings. That is, the following teachings provide a general description of a typical wireless computer/communication arrangement for effectuating the holster and wireless charging system taught herein.

The inventive holster and wireless charging system comprising the holster, rely up an application program incorporating general computer programming downloaded to and executable by multimedia communication devices, such as smartphones, tablets, and the like, to effect the wireless coupling and charging operation when the multimedia communication device is secure in the holster. Program functionality is selectively embedded in transitory and/or a non-transitory computer readable medium containing executable commands that are downloaded to the multimedia communication device. The inventive holster, wireless charging system and application program also are compatible with remote computing arrangements where wireless coupling and charging functions are executed remotely by computing devices, typically wirelessly coupled through an established communication network to the application program operational with the multimedia communication device or smartphone when secure in the holster and electronically coupled thereto.

The computer network may be a local area network, a wide area network, or a combination of networks that allow the computing system of the smartphone to wirelessly communicate with the holster and remote computers, such as the remote server computer of the application architecture, either directly or indirectly. The server computer and the remote server computer are typically similar to networking arrangement discussed above.

Such a computer network facilitates transmission and receipt of commands associated with operation of the holster and charging arrangements. These commands may be selectively executed via the wireless interface of the smartphone and holster and use of the GUI presented to the user on the smartphone's display device by the inventive application downloaded and operational therein. Hence, stored settings and commands may be updated, aggregated and/or modified according to the preferences of the user and transmitted and received to and from various devices that can be wirelessly coupled to an inventive holster.

Figure 2:
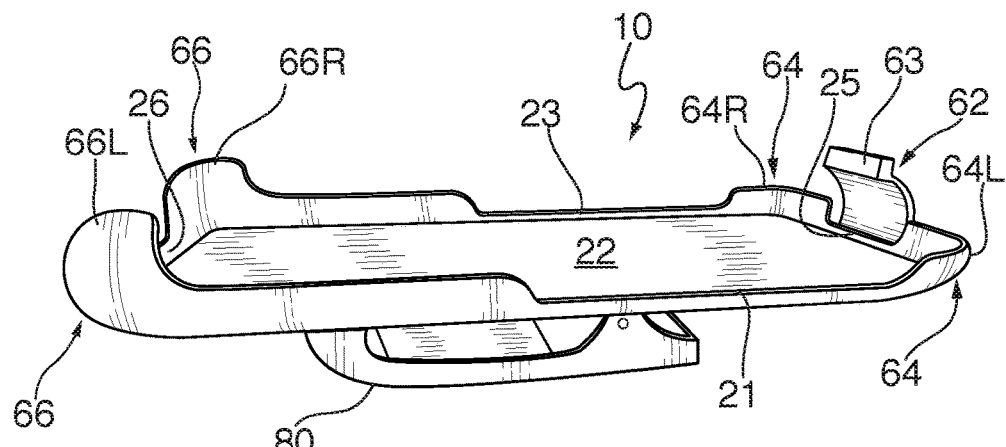
FIG. 2 is a further top, front and right-side perspective view of the holster of FIG. 1.
Figure 3:
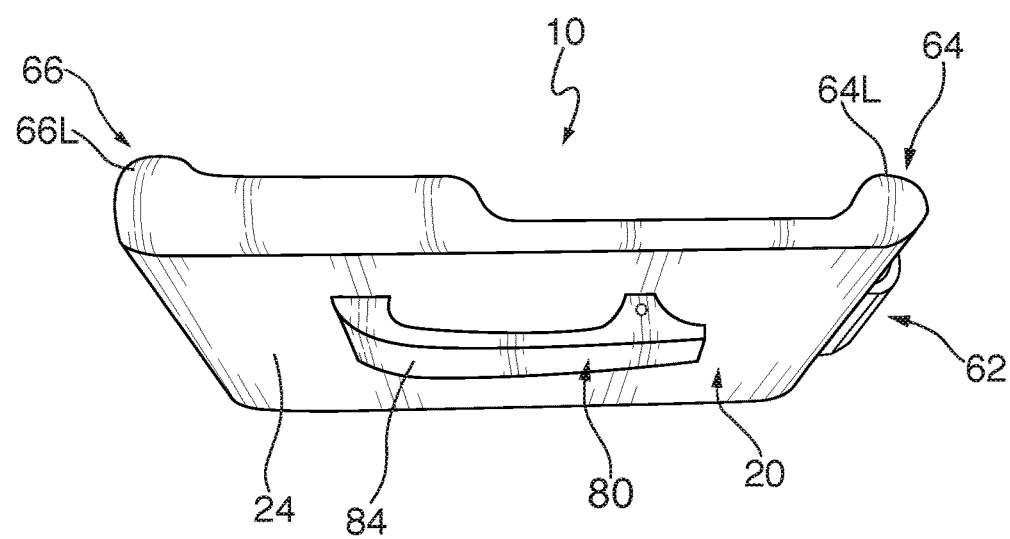
FIG. 3 is a bottom, rear and right-side perspective view of the holster of FIG. 1.
Figure 4:
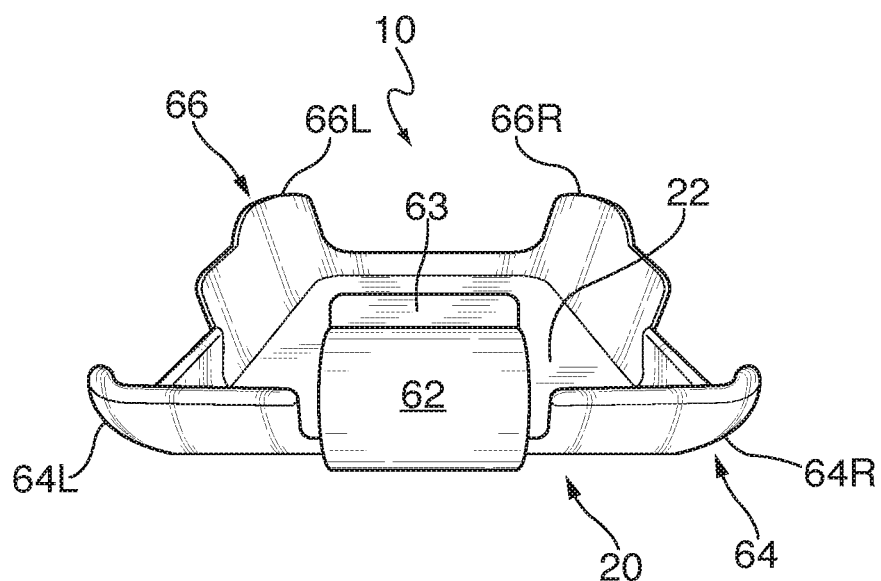
FIG. 4 is a top and front-edge perspective view of the holster of FIG. 1.
Figure 5:
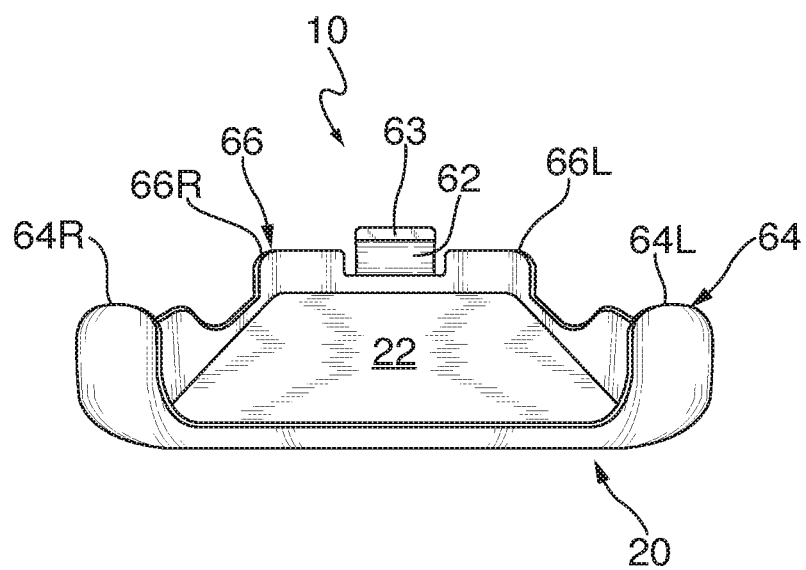
FIG. 5 is a bottom-side edge perspective view of the holster of FIG. 1.
Figure 6:
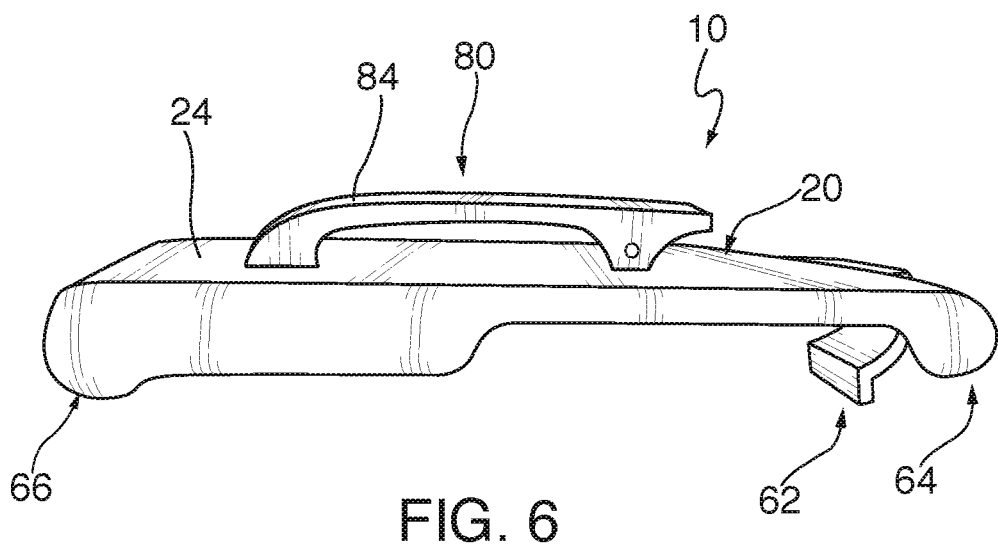
FIG. 6 is a left-side edge perspective view of the holster, with the back side facing up of FIG. 1.

Turning now in detail to FIGS. 1-11, therein illustrated is a novel holster 10 embodying the present invention which, as shown in FIG. 1, comprises a preferably generally planar rectangular base 20 sized and dimensioned with means for securely, detachably connecting a multimedia communication device such as a smartphone to a front or top side 22 of the base and a belt clip assembly 80 detachably connected to a back or bottom side 24 of the base (FIG. 2). For that matter, the generally rectangular base 20 includes front side having a top-face 22 and a bottom end 26, a rear bottom side having a bottom face 24, a left side (or edge) 21 and a right side (or edge) 23, and a top end 25 which are collectively sized and dimensioned to enable a smart phone to be received on the top face 22 and removably held in place therein by releasably securing means.

More particularly, the means for releasably securing the multimedia communication device to the front or top side 22 of the base 20 preferably includes a tension clip 62 and first and second preferably curved receiving flanges 64, 66. The first receiving flange 64 comprises respective flange elements 64R and 64L that extend upwardly from the two top corners of the base 20. The second receiving flange 66 comprises respective flange elements 66R and 66L, extending upwardly from the two bottom corners of the base 20. The respective flange elements 64R, 64L, 66R and 66L are contoured to receive corners of the multimedia communication device, such as a smartphone and features defined cut-outs or apertures therebetween to permit access to ports, speakers, and buttons disposed in the sides of the smartphone or other multimedia communication device.

A resilient, preferably curved tension clip 62 which projects from the middle of the top edge of the holster, protrudes over a midpoint of the top-end 25 over top face 22 of the base 20, between the flange elements 64R and 64L of the first receiving flange 64. Preferably, the tension clip 62 is formed of semi-rigid, resilient material and curved at its distal end and outfitted with a tactile curved edge 63 for receipt of one's finger to effect movement of said edge 63 to facilitate securing and releasing a multimedia communication device such as smartphone to and from the holster 10, respectively. The resilient tension clip 66 affords spring—biased like engagement of the clip over the smart phone and to the holster top face 22. More specifically, the corners of the receiving flanges 64 and 66 serve to maintain the smartphone on the top face 22 of holster base 20 with the resilient tension clip edge 63 biased against and holding down the top outer edge of the smart phone against top face 22. The base 20 and the means for releasably securing, including the receiving flanges 64, 66 and the tension clip 62, may be referred to hereinafter collectively as a releasable holding mechanism of the holster 10. And while the holding mechanism, or some subset of parts thereof, made be made of metal, the parts, such as the base, are preferably made of plastic by injection molding processes. Please note, however, that while the embodiment shown includes the flange elements 64R and 64L, the invention is not limited thereto. That is, the inventive holster may be configured without the (upper) receiving flange and flange elements 64R and 64L, as the top side 22 of the base includes the tension clip, which operates to biasely hold the smartphone to the base 20.

As can be seen in FIGS. 1-11, a smartphone or other multimedia communication device (i.e., any known electronic device that operates with a rechargeable battery and implements email/text messaging device or operational as a portable media player) may be secured in the holster 10 by placing each of the corners of the multimedia communication device within the respective receiving flanges 64, 66 of the holster 10 in reliance upon the upper 64R, 64L, and lower 66R, 66L flange elements and with the top edge of the device positioned underneath the resilient tension clip 62 for biased engagement therewith, as described in greater detail hereinafter.

Figure 7:
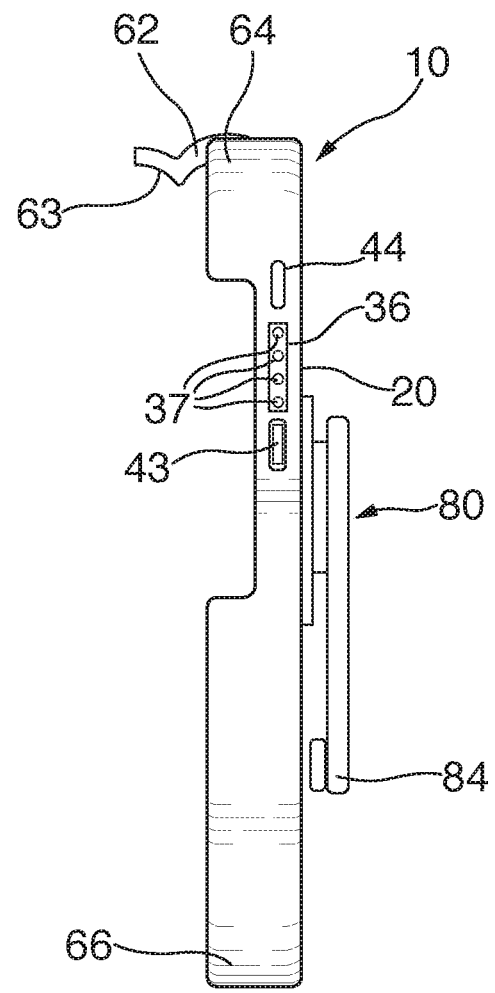
FIG. 7 is a schematically illustrated, right-side elevational view of the holster of FIG. 1.
Figure 11:
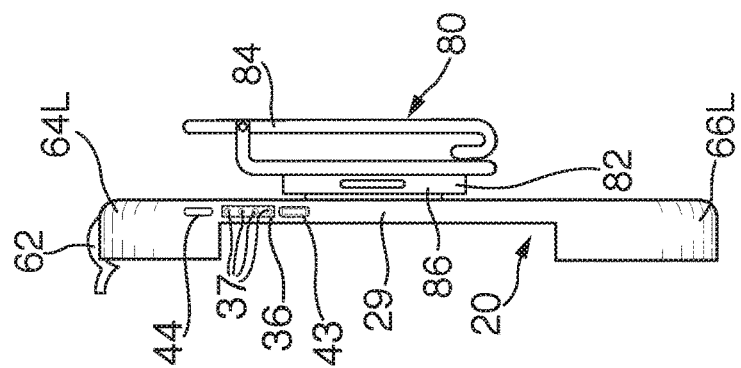
FIG. 11 is a schematically illustrated left-side elevational view of the holster of FIG. 8.
Figure 10:
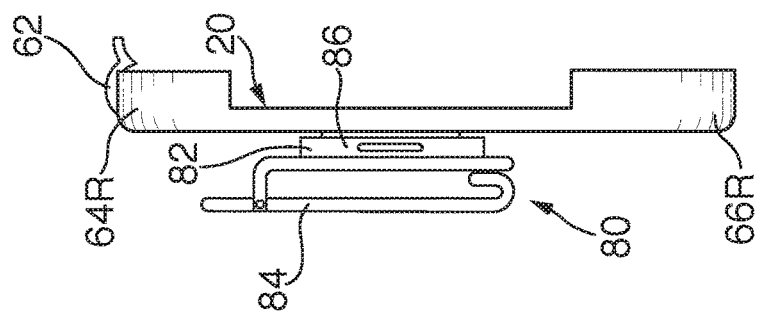
FIG. 10 is a schematically illustrated right-side elevational view of the holster of FIG. 8.
Figure 9:
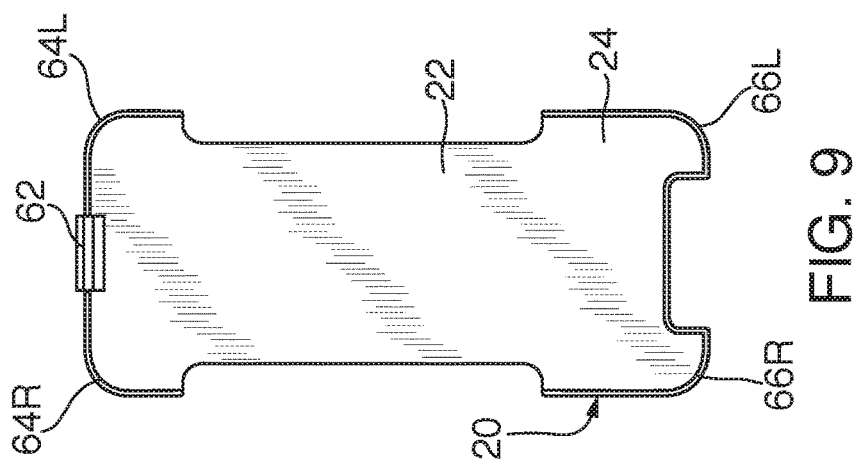
FIG. 9 is a schematically illustrated front elevational view of the holster of FIG. 8.
Figure 8:
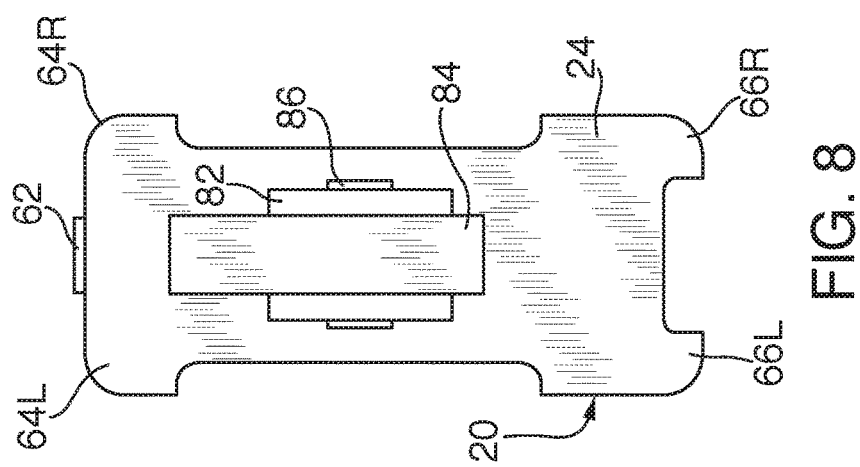
FIG. 8 is a schematically illustrated rear elevational view of a further embodiment of a holster embodying the present invention.

As shown in FIG. 7, preferably, the base 20 includes an on/off switch 43, and a battery strength indicator 36 in the left side edge of holster 80, for indicating existing (remaining) strength of the battery integrally mounted within the base 20, as described hereinafter. Please note, however, that the position of the battery strength indicator 36 on the left side (edge), as shown in FIG. 7, is not meant to be limiting in any way. The battery strength indicator may be positioned anywhere on the holster, as long as so positioned that it is able to communicate the remaining battery strength to a user.

The battery strength indicator 36 comprises a plurality of LED's 37 that are preferably serially aligned and spaced apart in the left side edge of the base. The plurality of LEDs 37 are arranged on the left side edge, proximate the top side edge of the base/holster. When the integral battery 38 is fully charged, all of the LED indicators 37 are illuminated. As the battery strength wanes, the LED indicators 37 sequentially cease to illuminate. Once the last LED indicator 37 ceases to illuminate, the smart holster 10 is no longer capable of wirelessly charging a multimedia communications device such as a smartphone secured therein.

As also seen best in FIG. 7, once a need arises to recharge the integral battery 38, the user inserts a distal male end of a charging cord (not shown) into a charging port 44 located on the left side or edge of the base in the base 20, preferably adjacent to the LED indicators 37. As the battery 38 charges, each respective LED indicator 37 will blink until the battery strength exceeds that power level. Once exceeded, the preceding the LED indicator 37 ceases to blink and remains illuminated while as the next LED indicator 37 starts to blink until the battery strength exceeds that power level thus causing that LED indicator 37 to remain illuminated. The integral battery 38 is fully charged once all of the LED indicators 37 are illuminated and no longer blinking. For that matter, as the integral battery 38 charges, a smartphone secured on the base can concurrently be charged.

A smartphone or other multimedia communication device is typically placed into the holster 10 by (1) holding the device or smartphone at an angle to the holster; (2) inserting one end (e.g., the bottom) of the device or smartphone into the contoured receiving areas of the bottom receiving flange 66; (3) flexing the tension clip 62 backward and away from the device or smartphone by applying force to the tactile edge 63 with one's finger; (4) inserting the other end of the device or smartphone into the contoured areas of the upper receiving flange 64; and (5) releasing the tension clip 62 to allow it to biasely return to its original position whereby the tension clip 62 presses the center top edge of the smartphone against the top surface 22 of the base 20 to releasably secure the smartphone in the holster. As used herein, the term "resilient" may be defined structurally as flexing upon the application of force to the distal end 63 of the tension clip 62 and returning to the original position upon release of the applied force. In the preferred embodiment, the receiving flanges and base are constructed as a single plastic piece via injection molding.

The size, shape, and orientation of the base 20 and receiving flanges 64, 66, typically will correspond to a specific model or models of multimedia communication devices such that the specific device fits snugly (and securely) in the holster 10. For example, the shape of the receiving flanges 64, 66 of the base 20 will vary depending on whether the device/smartphone to be secured and wirelessly charged is generally rectangular or square, and, if rectangular, depending on the ratio of the long and short sides of the device or smartphone. Also, the depth or thickness of the smartphone dictates the contours of the receiving flanges. Further, the length and width of the base will vary depending on the length and width of the device or smartphone.

The belt clip assembly 80 is integrally or detachably connected (e.g., mounted) to the back or under side 24 of the base 20, to detachably connect the holster 10 to a user's belt, garment, purse strap, backpack, pocket and the like of a user, without limitation. The belt clip assembly 80 features a tension spring assembly 82 coupled to a clip portion 84. The tension spring assembly 82 forces the clip portion 84 to remain in closed position. A user must apply force to the proximate end of the belt clip 80, which urges the distal end to move from a closed position to an open position. The degree of movement is a function of the force applied to the proximate end. Once the belt clip assembly 80 is urged to an open position, the user may introduce the distal end between a belt and/or contiguous garment until the proximate end can travel no farther. The user releases the belt clip assembly 80 at that point and the holster is now securely attached to the person of the user (i.e., the person's garment, upholstery, backpack, etc.)

The belt clip assembly 80 may include a swivel connector 86 (FIGS. 8, 10 and 11), such that the base 20 is engaged with the belt clip assembly 80 via the swivel connector 86. The swivel connector 86 enables the holding mechanism (base 20, flanges 64, 66 and tension clip 62), and the multimedia communication device secured by the holding mechanism, to rotate 360 degrees into any position desired by a user. The belt clip assembly 80 may be used to attach the holster to the belt, garment, purse strap, backpack, and the like of a user.

Figure 12:
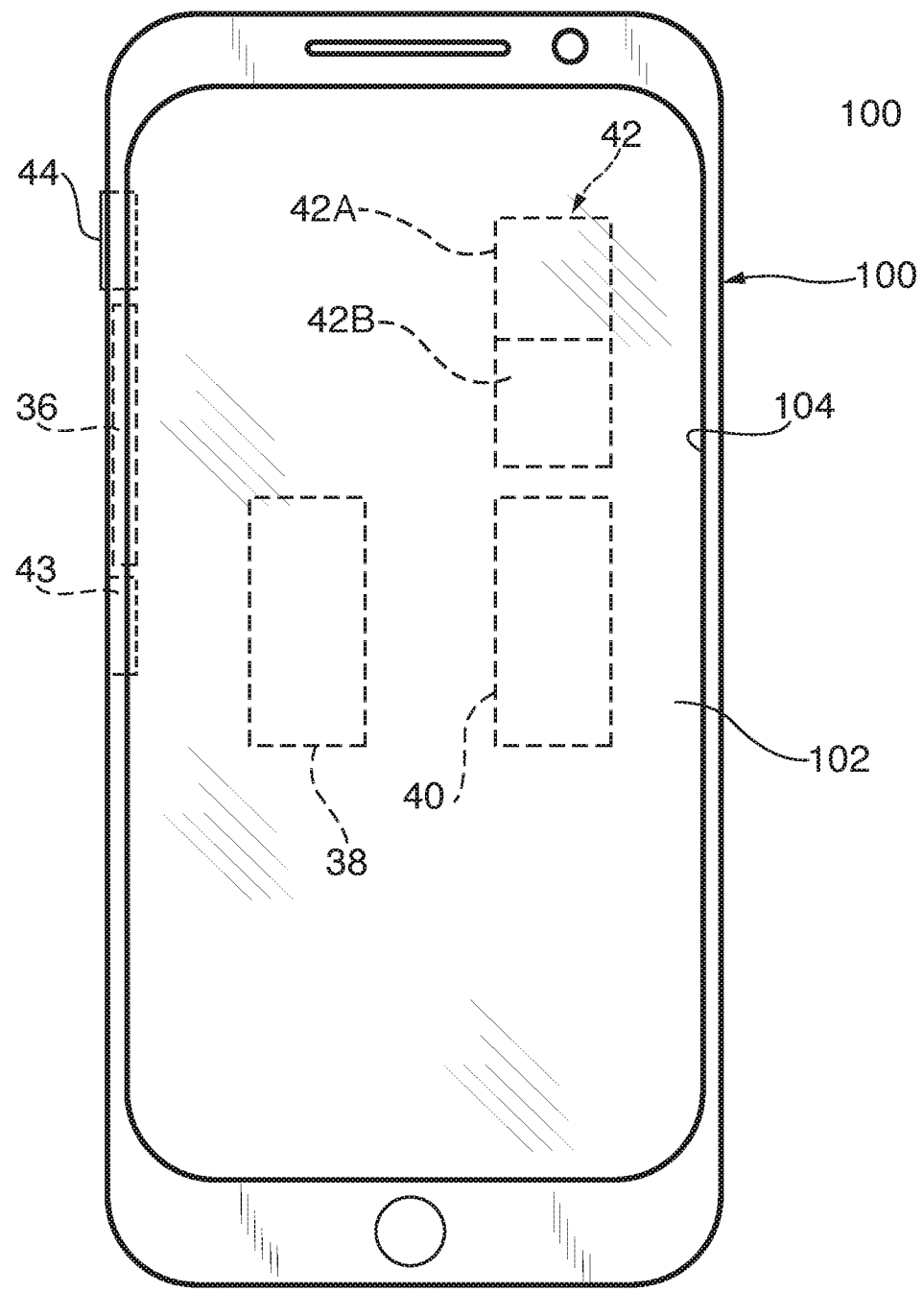
FIG. 12 is a block diagram representing a base of the inventive holster.

As shown in FIG. 12, the base 20 of the holster 10 houses a rechargeable integral battery 38 that must be recharged periodically after use in supplying the electrical energy for wirelessly charging a multimedia communication device (e.g., smartphone). The base also includes a wireless charging device 40, a Bluetooth (e.g., BLUETOOTH®) device 42, comprising a radio device 42A and a digital controller 42B, charging port 44, and the battery strength indicator 36.

The integral battery 38 is known technology and any conventional battery suitable for the purposes herein and compliant with the dimensions of the base may be incorporated. The wireless charging device 40 also is known technology and any conventional wireless charging arrangement suitable for the purposes herein and capable of interfacing with a wirelessly-coupled multimedia communication device, such as a smartphone, may be incorporated. Likewise, the BLUETOOTH® device 42 is known technology and any conventional digital configuration suitable for the purposes herein and capable of interfacing with a wirelessly-coupled multimedia communication device, such as a smartphone.

In accordance with typical mobile application (interchangeably referred to herein as "app") protocols, the user must first download the app from an app provider, such as APPLE STORE® or PLAY STORE®, onto the multimedia communications device. Once downloaded, the app may require certain permissions or access to the functionality of the multimedia communications device/smartphone, such as power consumption, app overrides, memory cards, location, etc. Optionally, the app may require the user create a profile that is accessible with the input of a username or an email address and a password. In alternative embodiments of the invention, logical expansion of the app teaches interfacing a single holster with multiple multimedia communication devices/smartphones, in the event the user has multiple devices or allows another user access to the holster 10 charge his or her multimedia communications device such as a smartphone.

Figure 13A:
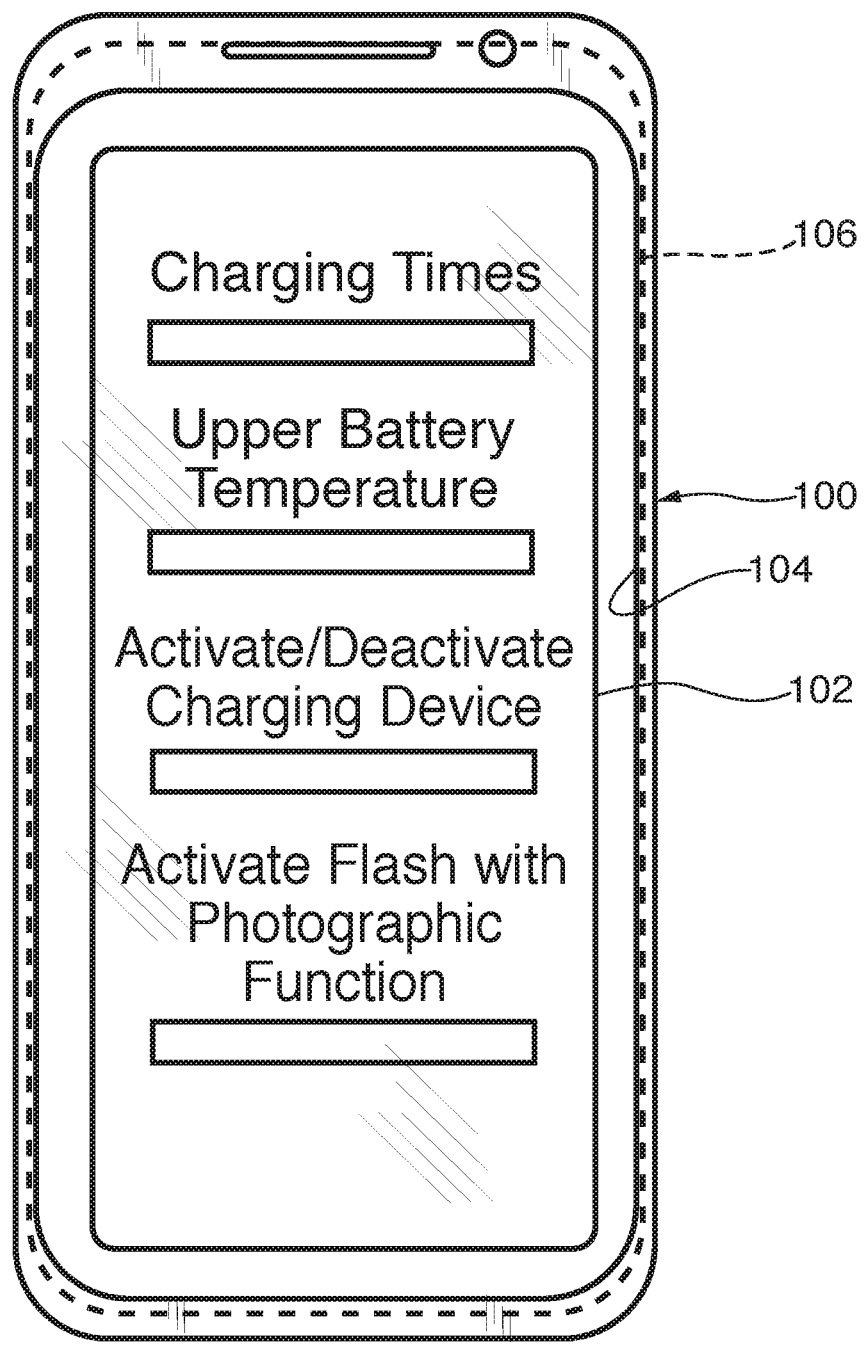
FIG. 13A depicts a smartphone display device and graphical user interface (GUI) designed to prompt a user to input charging data, such as charging parameters.
Figure 13B:
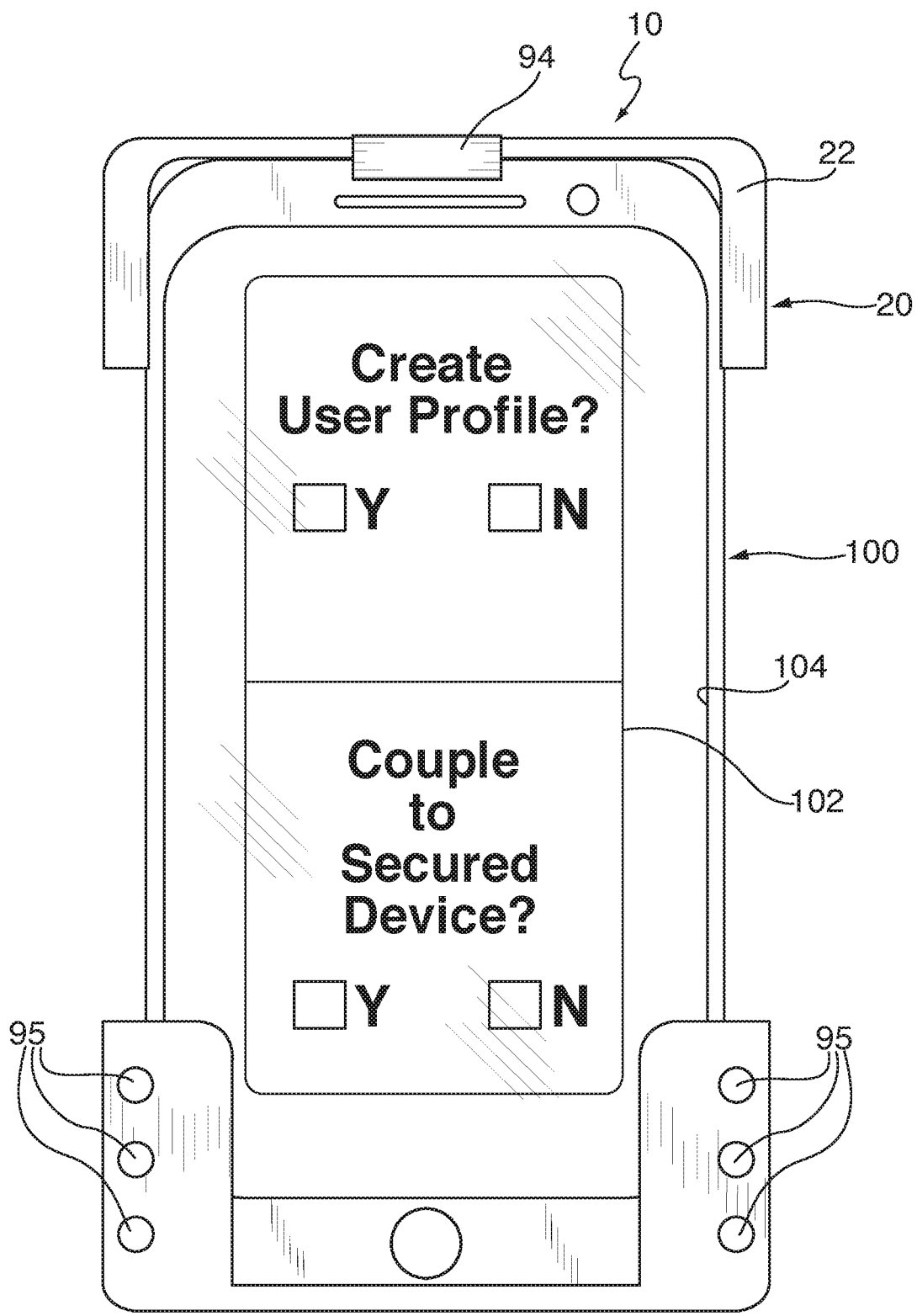
FIG. 13B depicts a GUI display that prompts a user to enter a user profile for charging the smartphone.

FIGS. 13A and 13B depict an exemplary multimedia communications device, embodying a smartphone 100 with a display device 104 for use with the inventive holster. Upon initializing the application program therein, the user is greeted by a graphical user interface (GUI) 102, prominently featuring one or more prompts to enter charging-related data and/or create a user profile for the device for use with the holster's intended operation. By agreeing (i.e., inputting an acknowledgement upon prompting), a new display image is presented in the GUI that includes fields defined to receive input by the user to define the charging data and parameters of the device in question. Once the user profile is created, the app prompts the user to wirelessly couple to the holster using the Bluetooth technology (i.e., BLUETOOTH® device 42).

Once the application program has the multimedia device/smartphone 100 and holster 10 communicating wirelessly, the user selectively determines the settings optimal for his/her purposes, using the GUI. Namely, the app allows the user to regulate charging times, battery temperature, turning charging device on or off, and controlling other integral features of the holster taught herein. Using the inventive holster 10 substantially increases the battery life of a battery 106 included in the multimedia device or smartphone 100, on a daily basis without the inconvenience of physically connecting any external power source to the device (e.g., smartphone).

At the command of a user executed through the GUI 102, the user can set the holster 10 to recharge a device/smartphone 100 (secured therein) at a designated time or battery level. For instance, if the user wishes the holster to only begin wirelessly charging the device/smartphone 100 coupled thereto, when the smartphone battery level depletes to 25%, the user, via the GUI, inputs command data to effectuate charging automatically, when the predefined parameters are met. Once the smartphone is fully charged, or charged to a preset level, the holster automatically ceases charging to conserve the battery strength of the holster 10. The GUI 102 also allows a user to deenergize the charging device 40 in the event the temperature of integral battery 38 exceeds a (programmed) safe operating temperature. This prevents injury to the user and damage to the holster and the smartphone 100 that might be caused by overheating of the integral battery, which could even lead to the integral battery exploding.

Figure 13C:
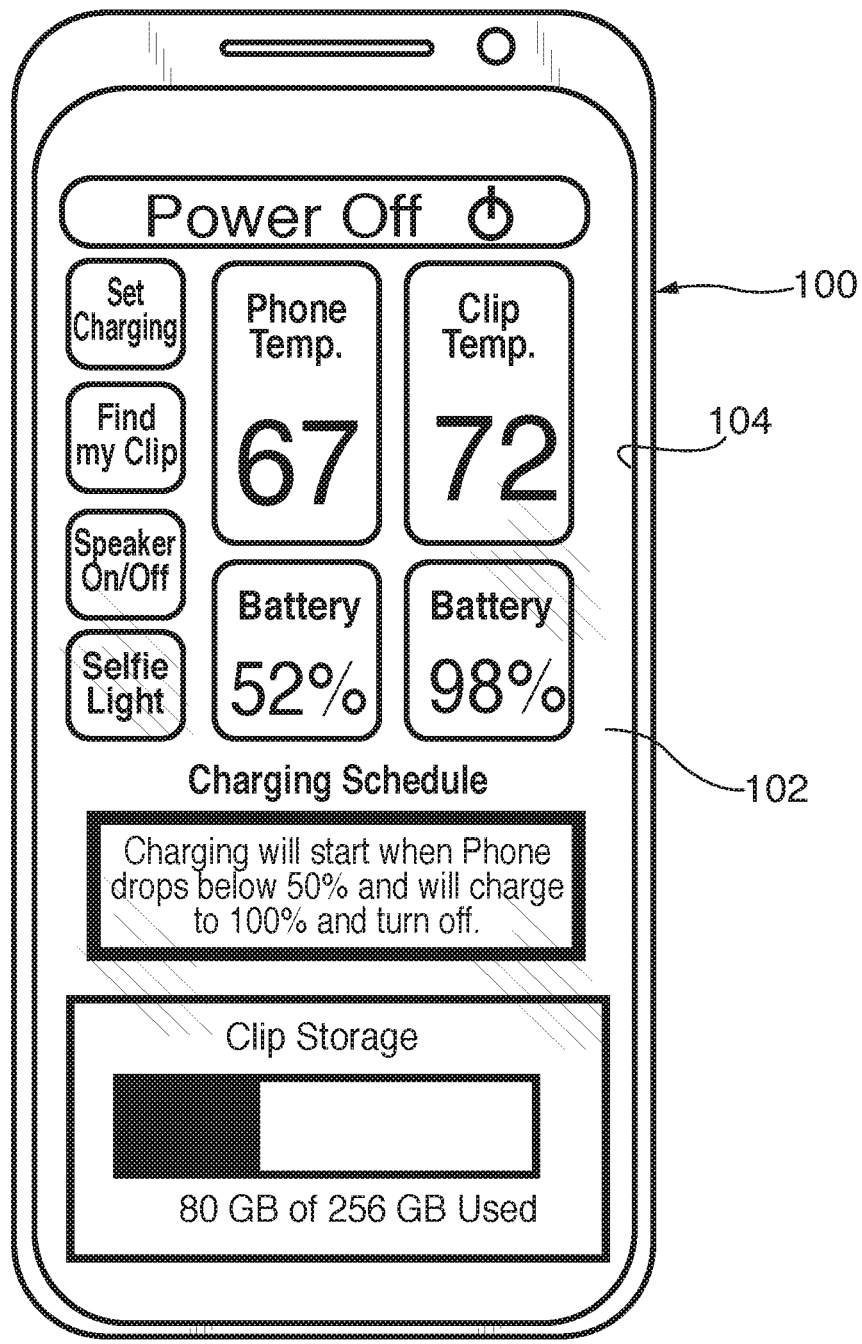
FIG. 13C depicts an alternative GUI for use in receiving various charging and user related data.
Figure 14:
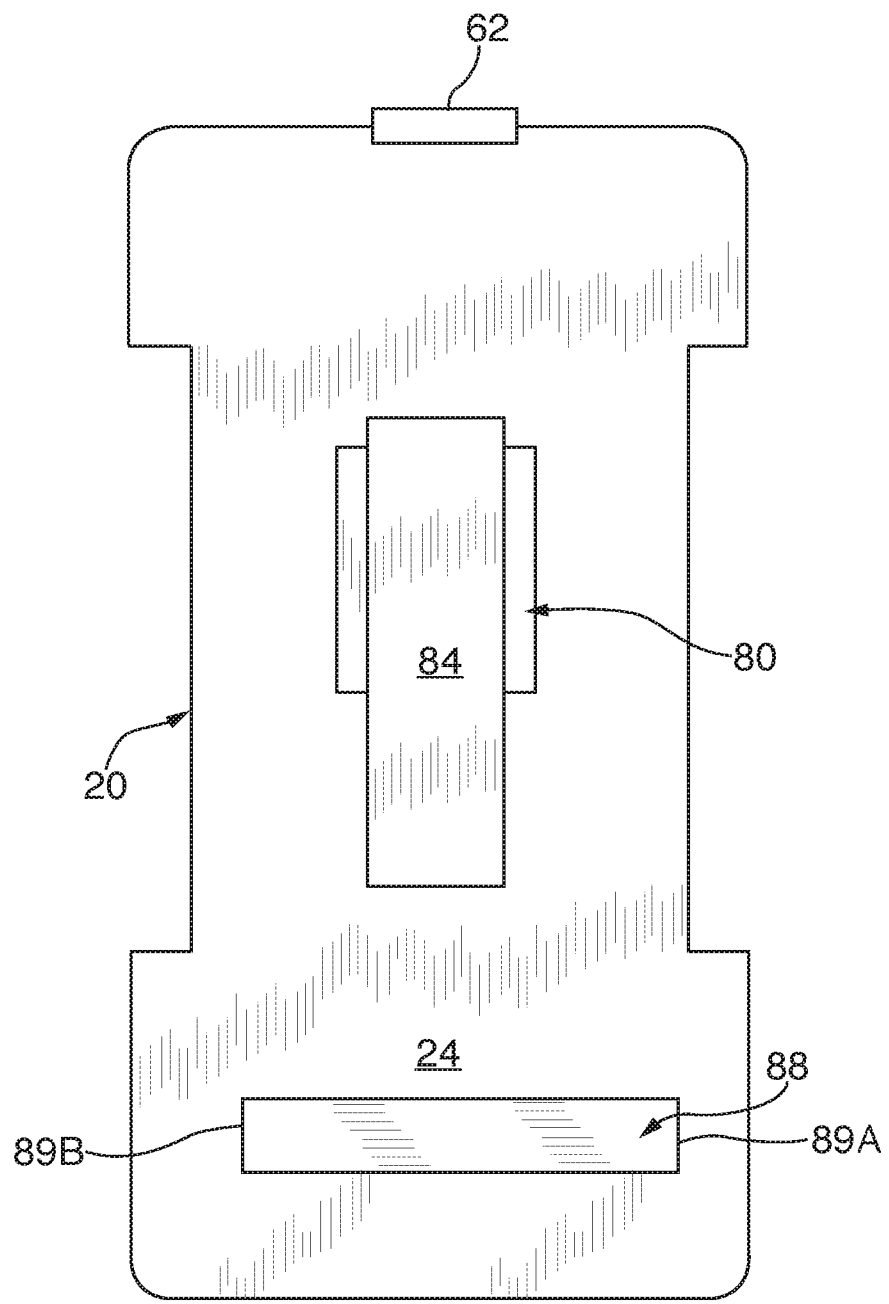
FIG. 14 is a schematically illustrated bottom plan view of the underside of a further embodiment of the inventive holster that includes a kick stand.

FIG. 13C highlights an alternative embodiment of the GUI 102 within display device 104. As shown therein, the GUI 102 enables a user to control power, set charging, find "my clip," turn a speaker on and off, turn on a selfie light, communicate the phone and clip temperatures, define the charging schedule, and define the memory usage in clip storage (see more details below), FIG. 14 depicts an embodiment of the inventive holster 10 that includes an extendable kickstand 88 incorporated on the underside 24 of the base 20. The kickstand 88 recesses flush with the surface of the underside 24 of the base, in place of, or in addition to the detachable belt clip assembly 80. The extendable kickstand 88 comprises an extending planar arm. A first end 89A of the kickstand 88 is pivotally coupled to the back or underside 24 of the base 20, such that when the kickstand 88 is extended (from its recessed position) by manual force, a distal end 89B travels a predetermined distance to a deployed state. Once extended, the distal end of the kickstand 88 can support the holster 10 on a support surface (e.g. a kitchen counter). For example, using the kickstand, the base 20 (and phone acted thereto) may be manipulated to a landscape orientation optimal for viewing streaming content on a multimedia communication device in a hands-free manner. Alternatively, in a holster embodiment where the swivel belt clip assembly 80 is attached, the swivel belt clip portion 84 can be rotated and extended to lock at a predetermined angle and support the holster in a landscape orientation.

Figure 15:
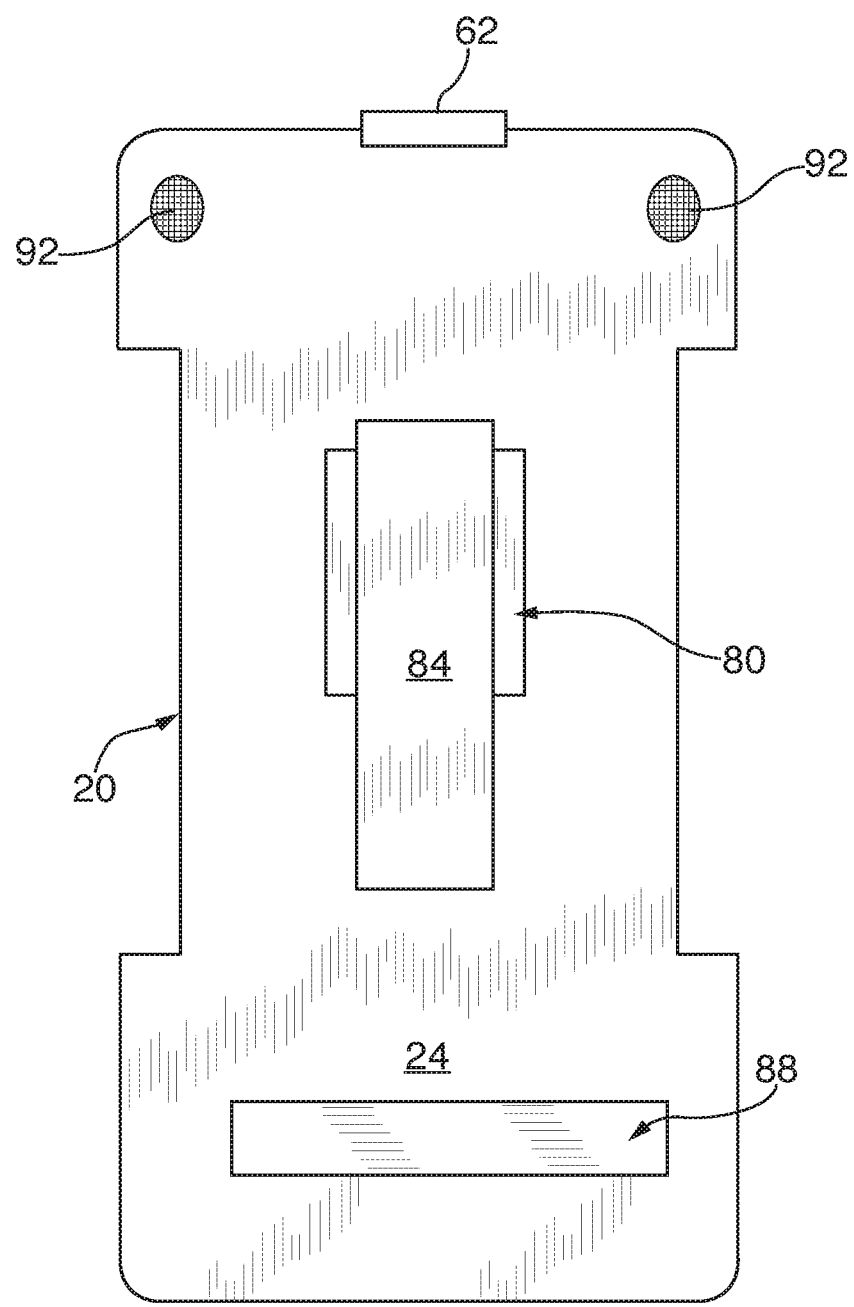
FIG. 15 is a schematically illustrated bottom plan view of a further embodiment of the inventive holster including a pair of digital speakers positioned on the base.

In another embodiment depicted in FIG. 15, the holster 10 teaches inclusion of one or more digital speakers 92, positioned on the back or underside 22 of the base 20 (but not limited to said positioning) to boost the traditionally low maximum sound volume of a typical smartphone. The Bluetooth technology (i.e., in the BLUETOOTH® device 42), in conjunction with mobile app, will allow the user to simultaneously play music through the speaker on their smartphone and the holster thus providing greater sound volume and sound quality. The user may control the volume of the speaker in the holster using the mobile app settings, examples of which are depicted at least in FIG. 13C.

Figure 16:
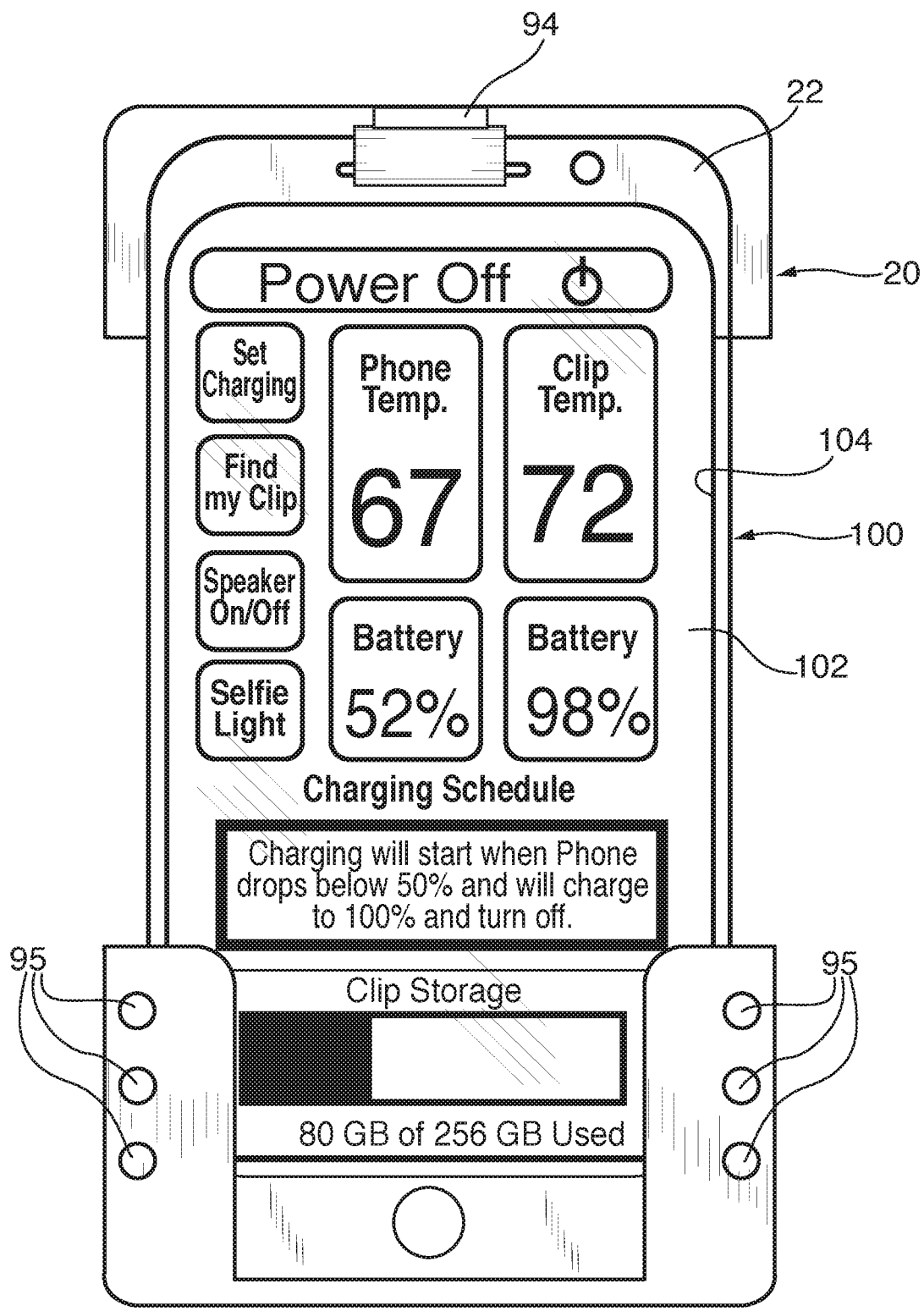
FIG. 16 is a schematically illustrated top plan view of a further embodiment of the inventive holster holding a smart phone that includes flash technology.

FIG. 16 depicts another embodiment of the inventive holster that includes flash technology in the form of a light 94, as shown. Additional lighting, such as LEDs 95, may be housed in the receiving flanges 64, 66 to provide better lighting for photos, including selfies, taken using a multimedia communication device (e.g., smartphone) with photographic capability in low-light conditions. While most smartphones only have flash capability on the backside of the smartphone, FIG. 16 shows a smartphone 100 attached to the base 20 of holster 10, where a light 94 is positioned at a top portion of the front surface 22 of base 20 for use in capturing images and video. The light 94 is activated when the smartphone's controls are activated by the user. The light 94 also accessible on the back or underside of the base 20/holster 10 for selfies. Hence, taking a selfie with the smartphone display facing the user is not optimal in low-light conditions. The Bluetooth technology (i.e., in the BLUETOOTH® device 42), in conjunction with the mobile app, allows the user to take a selfie with improved lighting in reliance upon the flash technology housed in the receiving flanges.

Please further note that the mobile app will require permission to access the camera of the smartphone 100, thus when the user takes a selfie, the integral flash technology, i.e., light 94 composed of LEDs 95, will simultaneously illuminate when the camera shutter is opened to capture the image, concurrently with the camera trigger by the smartphone. This additional lighting provides greater selfie quality. The user may control the flash technology in the holster using the mobile app settings made available by the GUI 102, as explained above.

With the ever-increasing amount of data and multimedia content available to smartphone users, memory and storage space limitations can impede the functioning of a smartphone, thus preventing the user from full enjoyment of the smartphone. In still another embodiment, the inventive holster features an integral secure digital storage device (SD) incorporated in a sidewall of the base 20. The additional storage provided by the inventive holster greatly expands the storage capability and functionality for the smartphone when positioned in the inventive holster 10. This functionality facilitates the user downloading movies and other large files (from the smartphone) to the additional memory storage in the holster without compromising the storage capacity and memory of the smartphone 100. The storage device (SD), depending upon its storage capacity, can store thousands upon thousands of pictures, music files, etc., thus freeing critical storage space and memory on the smartphone.

The Bluetooth technology (i.e., in the BLUETOOTH® device 42), in conjunction with the inventive mobile phone application program allows the user to transfer files to and from the smartphone of the user to the SD. The user may control the transfer and storage of multimedia files to the SD using the mobile app settings. Additionally, the increased storage space could be incorporated into the base housing and data/multimedia content is transferred wirelessly via BLUETOOTH® technology.

While the preferred embodiment of the smart holster has been described in detail, it should be apparent that modifications and variations thereto are possible, all of which fall within the true spirit and scope of the invention. With respect to the above description then, it is to be realized that the optimum functionality for the components of the invention, to include variations in dimensions and functionality are deemed readily apparent and obvious to one skilled in the art, and all equivalent relationships to those illustrated in the appendices, images, and embodiments described in the specification are intended to be encompassed by the present embodiment of the invention. Moreover, the scope of this invention anticipates the incorporation of the above teachings in tablets, electronic monitors, wearable computers, and the like. Hence, the present invention has been described above in terms of specific embodiments, it is to be understood that the invention is not limited to these disclosed embodiments.

The invention claimed is:

1. A holster for receiving and wirelessly charging a device battery of a multimedia communication device detachably connected to the holster, comprising:
   a base;
   means for releasably securing the multimedia communication device on said base;
   a rechargeable battery mounted within said base; and
   a wireless charging device mounted within said base for wirelessly charging said device battery using electrical energy stored within said rechargeable battery, whereby upon releasably securing the multimedia communication device on said base, said device battery can be wirelessly charged via said wireless charging device.

2. The holster of claim 1, wherein said base is generally rectangular, and comprises a substantially planar top face and an opposite substantially planar bottom face and a sidewall peripherally joining said top and bottom faces, and wherein said means for releasably securing further includes a clip and at least one pair of opposing flanges mounted on said base between which the multimedia communication device can be releasably secured on said base.

3. The holster of claim 2, wherein said clip is a resilient tension clip mounted adjacent said top face of said base which is biasedly engageable with the multimedia communication device to effect releasable securement thereof against the top face of said base.

4. The holster of claim 1, further comprising a belt clip assembly attached to said base.

5. The holster of claim 1, wherein said base further comprises a battery strength indicator that reflects a state of charge of the base's rechargeable battery.

6. The holster of claim 1, wherein said base further comprises a charging port in said base for charging said rechargeable battery.

7. The holster of claim 1, further comprising a flash system digital projection system connected to said base and controlled to flash concurrently with a flash system of the multimedia communication device coupled and detachably connected thereto.

8. The holster of claim 1, wherein said base further comprises an integral secure digital storage device (SD) for additional memory storage capacity that is accessible to, and operational as supplemental storage for, the multimedia communication device.

9. The holster of claim 1, further comprising a Bluetooth device for wirelessly, communicatively coupling the base to the multimedia communication device when said multimedia communication device is releasably secured to the base.

10. A holster for receiving and wirelessly charging a device battery of a multimedia communication device detachably connected to the holster, comprising:

a base;
means for releasably securing the multimedia communication device to said base;
a rechargeable battery mounted in said base;
a Bluetooth device mounted in said base for wirelessly, communicatively coupling said base to the multimedia communication device releasably secured to said base; and
a wireless charging device mounted in said base for wirelessly charging said device battery using electrical energy stored within said rechargeable battery; and
means for controlling the operation of said wireless charging device whereby upon releasably securing the multimedia communication device on said base and wirelessly, communicatively coupling said base to the multimedia communication device, via said Bluetooth device, said device battery can be wirelessly charged by said wireless charging device, via said means for controlling wherein a user selectively determines settings that control charging upon wirelessly coupling the detachably connected base to the multimedia communication device.

11. The holster of claim 10, wherein said means for controlling includes settings defined by a user profile for the multimedia communication device.

12. The holster of claim 10, wherein one of the settings provides for automatically charging the wirelessly coupled and detachably connected multimedia communication device upon reaching a pre-determined parameter.

13. The holster of claim 10, wherein said wireless charging device includes a temperature sensor and wherein said means for controlling said operation of said wireless charging device automatically de-energizes said wireless charging device when a temperature detected by the temperature sensor exceeds a pre-determined temperature.

14. The holster of claim 10, further comprising a digital speaker connected to said base for receiving an audio signal comprising sound data from the multimedia communication device releasably secured to said base and simultaneously outputting the sound data through the digital speaker.

15. A wireless charging system for wirelessly charging a device battery of a multimedia communication device, the wireless charging system comprising a holster for the multimedia communication device for receiving and wirelessly charging the device battery and an application program that is downloadable to, and operational within, the multimedia communication device to control multimedia communication device functions including wirelessly charging the device battery when the multimedia communications device is detachably connected and wirelessly, communicatively coupled to the holster, wherein the holster comprises:
a base;
means for detachably connecting the multimedia communication device to the base;
a rechargeable battery mounted in said base;
a Bluetooth device mounted in said base for wirelessly, communicatively coupling said base to the multimedia communication device; and
a wireless charging device mounted in said base for wirelessly charging the device battery using electrical energy stored within the rechargeable battery;
wherein upon detachably connecting and wirelessly coupling the multimedia communication device to said base, the application program operates a graphical user interface (GUI) enabling user input for controlling multimedia communication device functions, including a function for effecting the wireless coupling and a function for effecting the wireless charging of the device battery.

16. The wireless charging system of claim 15, wherein said base is formed with first and second substantially planar opposed surfaces and said means for detachably connecting comprises a tension clip connected to said base to enable detachable connection of the multimedia communication device.

17. The wireless charging system of claim 16, wherein the tension clip is outfitted with a tactile edge to facilitate the detachable attachment and release of the multimedia communication device to said base.

18. The wireless charging system of claim 15, wherein the means for detachably connecting comprise a first receiving flange that extends upwardly from two top corners of said base, a second receiving flange that extends upwardly from two bottom corners of said base and wherein the tension clip is positioned to protrude from the second surface at a midpoint between one of said two top corners and said two bottom corners.

19. The wireless charging system of claim 15, further including a belt clip assembly connected to said base for connecting the belt clip assembly to any of a user's belt, garment, purse strap and backpack.

20. The wireless charging system of claim 19, wherein the belt clip assembly includes a clip portion and a tension spring assembly coupled to the clip portion.

21. The wireless charging system of claim 20, wherein the belt clip assembly includes a swivel connector that provides that said base assembly, and any multimedia communication device detachably connected thereto, to rotate up to 360 degrees.

22. The wireless charging system of claim 21, wherein upon attachment, the belt clip assembly may be rotated and extended to lock at a predetermined angle.

23. The wireless charging system of claim 15, wherein the application program is downloadable to the multimedia communication device.

24. The wireless charging system of claim 23, wherein the application program comprises a set of computer readable instructions stored on a non-transitory, computer readable medium and wherein the computer readable instructions are downloadable to the multimedia communication device.

25. The wireless charging system of claim 24, wherein the application program is capable of receiving input for controlling the multimedia communication device functions from a remote computing device, including commands associated with operation of the holster and charging arrangements thereof.

26. The wireless charging system of claim 15, further comprising the multimedia communication device.

27. The wireless charging system of claim 15, wherein the input through the GUI is maintained in a profile associated with the multimedia communication device.

28. The wireless charging system of claim 27, wherein upon completing the profile, the GUI prompts the user to wirelessly couple the multimedia communication device to said base.

29. The wireless charging system of claim 15, wherein said base has sidewalls and said system further comprises a battery charge indicator arranged in one of said sidewalls of said base.

30. The wireless charging system of claim 15, wherein said base has a bottom face with a recessed portion and further comprises an extendable and retractable kickstand mounted on said bottom face of the base movable between a non-deployed state in which it retracts within said recessed portion of said bottom face of said base and an operative deployed position in which it is extended outwardly from said base.

31. The wireless charging system of claim 30, wherein said kickstand comprises an extendable and retractable planar arm.

32. The wireless charging system of claim 15, additionally including a charging port in said base for charging the rechargeable battery.

33. A method for wirelessly charging a device battery of a multimedia communication device using a holster comprising a base, means for detachably connecting the multimedia communication device to the base, said base further including a rechargeable battery, a charging port for charging the rechargeable battery, a Bluetooth device for wirelessly, communicatively coupling the base to the multimedia communication device and a wireless charging device for wirelessly charging the device battery using electrical energy stored within the rechargeable battery, wherein the method comprises the steps of:

downloading to, and operating, an application program in the multimedia communication device to manage holster operation, including controlling charging of the multimedia communication device;

connecting the multimedia communication device to the base of the holster;

operating the application program to generate a graphical user interface (GUI) for providing user prompts for input for controlling multimedia communication device functions, including a function for effecting wirelessly communicatively coupling of the holster and multimedia communication device; and wirelessly charging the device battery in response to one of a prompt input by a user manually via the GUI, and by the application program automatically upon detection of a predetermined condition.

34. The method of claim 33, wherein the step of operating includes providing a set of parameters for the multimedia communication device, and wherein the parameters control wireless charging of said multimedia communication device.

35. The method of claim 33, wherein the holster includes additional memory storage and wherein the step of operating includes controlling access to, and from, the additional memory storage device by the multimedia communication device.

36. The method of claim 33, further including a computer program embodying a non-transitory computer readable medium encoded with instructions executable by a processor to implement operation of the application program.

\* \* \* \* \*